Patented Mar. 19, 1929.

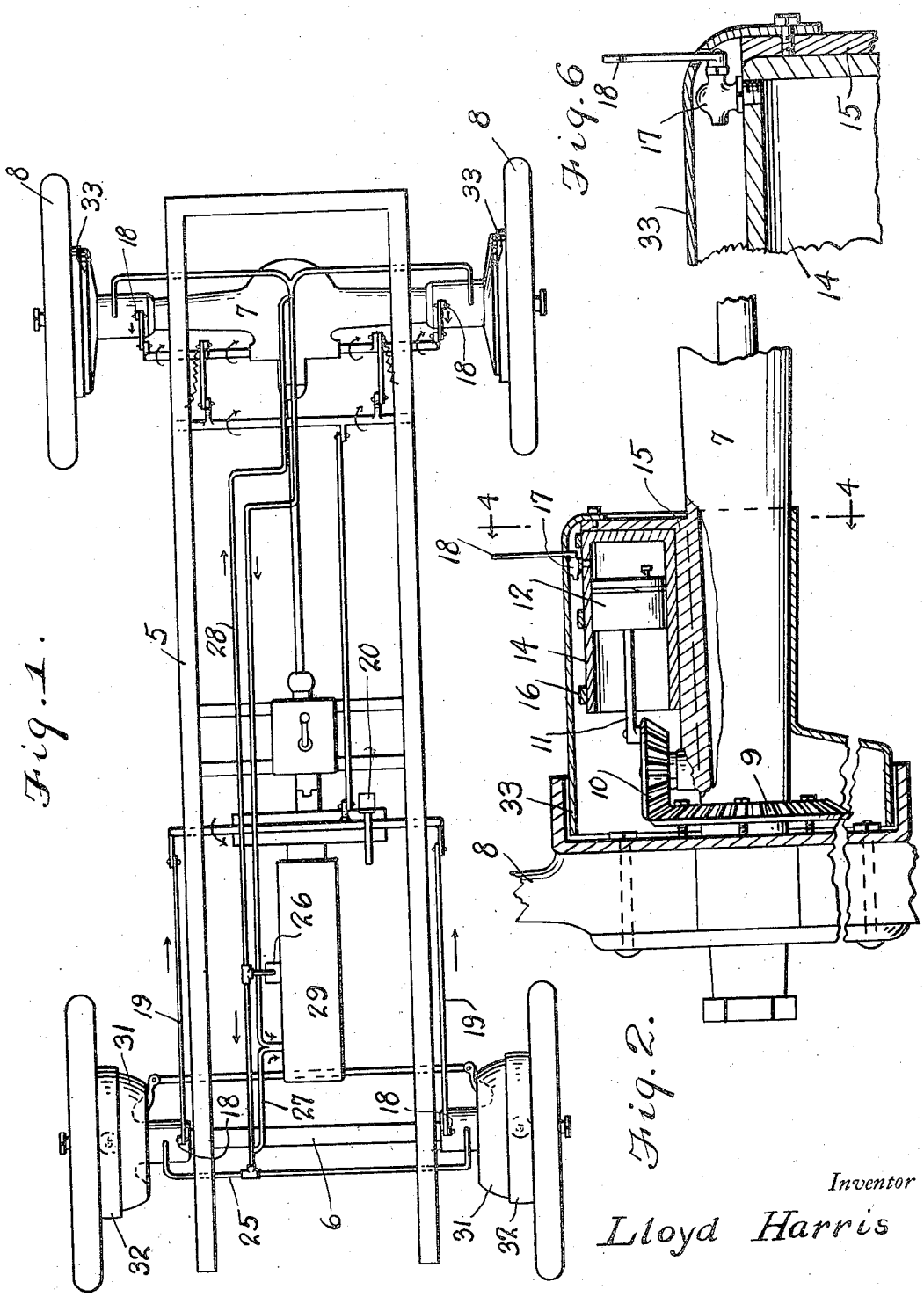

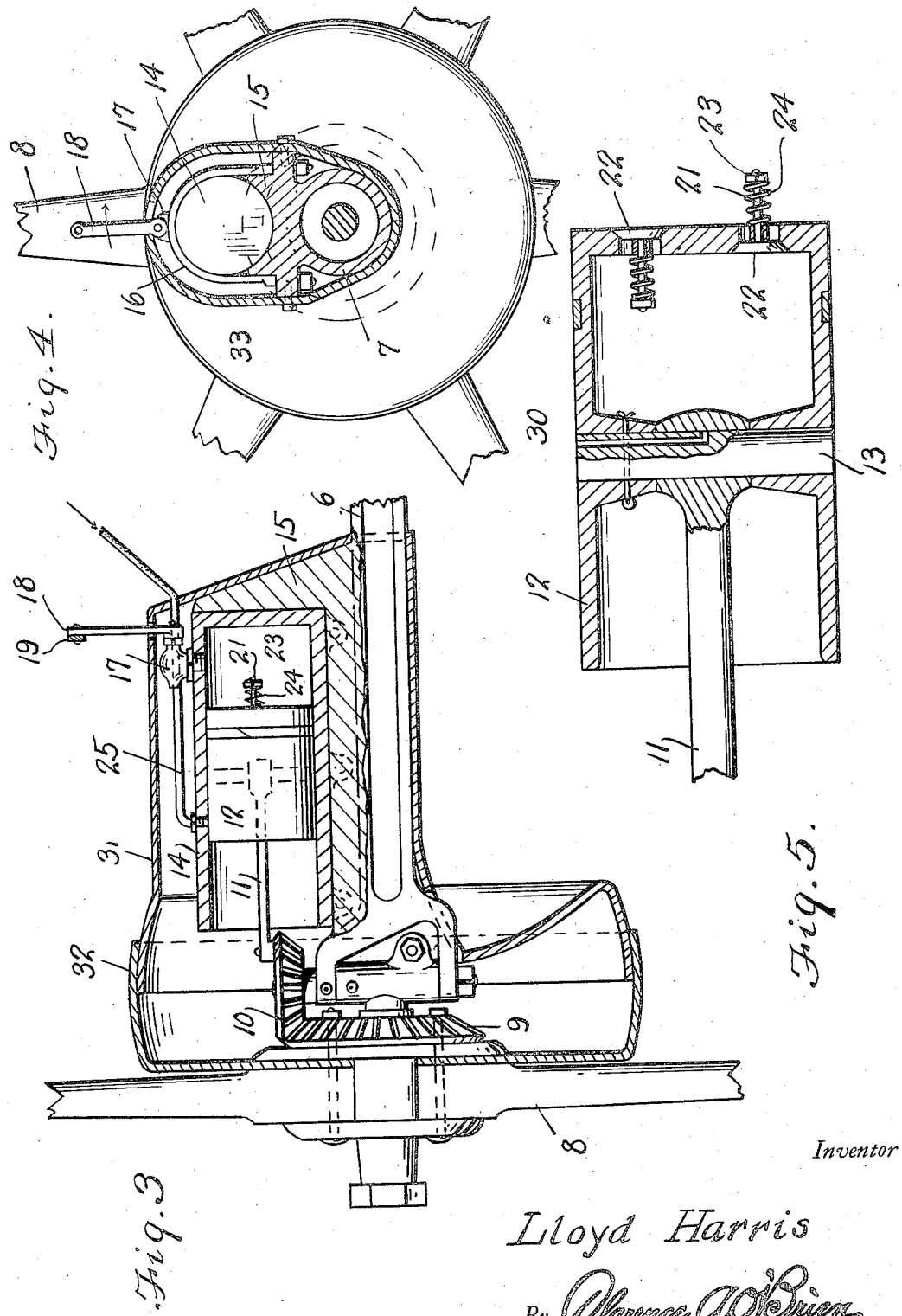

1,705,565

UNITED STATES PATENT OFFICE.

LLOYD HARRIS, OF RUSHSYLVANIA, OHIO.

VEHICLE BRAKE.

Application filed June 2, 1927. Serial No. 196,021.

My invention relates to a brake mechanism for vehicles, such as automobiles and the like, and has for its principal object to provide a brake construction comprising a piston slidably mounted within a cylinder and operatively connected with the vehicle wheel whereby the braking force will be created by increasing or decreasing the compression of the piston within the cylinder. By providing a brake mechanism of this character the use of the conventional type of brake band is eliminated thereby dispensing with the annoyance of brake adjustment, replacing of brake bands, the grabbing of the brake, as well as the skidding of the car due to an uneven application of the brake.

Another object of the invention is to provide operating means for the piston forming a permanent connection with the vehicle wheel whereby to continuously operate the piston and to provide control means operated from the instrument board of the vehicle connected with the compression end of the cylinder whereby to relieve the same of all pressure therein during the normal running of the car and to increase the pressure therein against the operation of the piston so as to cause a braking action for the wheel.

Another object of the invention is to provide automatic valves carried by the piston communicating with the compression chamber properly tensioned so as to prevent the creation of too great a pressure within the cylinder so as to prevent a too sudden stopping of the wheel thereby to eliminate skidding of the car.

A further object of the invention is to provide an oiling system extending from the engine of the car to the piston within the cylinder whereby to properly lubricate the same.

A still further object is to provide a dust and dirt proof housing for the entire brake mechanism.

Other objects and advantages reside in the special construction, combination and arrangement of the various elements forming a part of the invention, reference being had to the accompanying drawings forming a part hereof, wherein:

Figure 1 is a plan view of an automobile chassis showing my brake mechanism in operative position thereon, Figure 2 is a vertical sectional view through one of the brake cylinders and coacting parts in position upon the rear axle of the wheel, Figure 3 is a similar view showing the method of mounting the device in connection with the front wheel of the vehicle, Figure 4 is a vertical sectional view taken substantially along a line 4—4 of Figure 2, Figure 5 is a longitudinal sectional view through one of the pistons showing the automatic pressure valve, and Figure 6 is a fragmentary sectional view through the inner end of the cylinder showing the position of the brake control valve with respect thereto.

Referring now to the drawings I have shown my invention adapted for use upon an automobile chassis indicated at 5 having front and rear axles 6 and 7 respectively, upon which are mounted the wheels 8. Attached to the inner hub of each of the wheels I arrange a bevel gear 9 adapted to rotate with the wheel and upon the upper portion of the axle adjacent thereto is a similar gear 10 arranged in engagement therewith. A connecting rod 11 is eccentrically connected to the gear 10 and extending in a horizontal position and having its opposite end provided with a piston 12 the rod 11 and piston 12 being suitably connected by a wrist pin 13. The piston is arranged to slidably move within a cylinder 14 horizontally arranged along the upper side of the axle and firmly secured to an axle engaging clamp 15 by a set of straps 16 or the like.

Within the inner end of the cylinder is arranged an air cut-off valve 17 having an operating lever 18 connected therewith and extending upwardly from the cylinder and attached at its upper end to a brake rod 19 suitably connected with the foot brake lever 20 of the automobile. Each wheel of the car is provided with a piston operated mechanism similar to that described above and each of the cylinders is likewise provided with an air cut-off valve and operating lever connected by the usual brake rods to the foot brake lever 20. In this manner each of the air cut-off valves for the various cylinders is connected for simultaneous operation.

Within the inner end of each piston I provide a pair of pressure operated valves, the valves in each piston being oppositely arranged and comprising a valve stem 21 having a valve head 22 formed in one end thereof and a nut 23 threaded on its opposite end. The valve stem 21 is inserted through an opening in the end of the piston, the end of the stem opposite from the head being provided with a coil spring 24 tensionally retained against the nut 23 and the piston wall whereby to normally retain the valve in closed position. The purpose of the valve explained above is to prevent the creation of too great a pressure within the end of the cylinder when the air cut-off valve 17 is closed so as to prevent such pressure from completely stopping the movement of the piston which would cause the locking of the wheels. It is to be understood that one of said valves is designed for relieving the cylinder from the creation of too great a vacuum and the opposite valve for relieving the cylinder from the creation of too great a compression.

An oiling system is provided for the piston as well as for the end of the connecting rod attached thereto, comprising an oil feed pipe extending through the wall of the cylinder adjacent the movement of the piston and connected with an oil pump 26 attached to the crank case of the motor. A return passage for the oil to the crank case is provided whenever the oil supply fed by the pump is in excess of the consumption thereof and comprises a pipe 27 connected near each end of the main oil feed pipe 28 and attached to the crank case 29 of the motor. The wrist pin 13 is provided with a longitudinally extending oil duct 30 extending from the wall of the piston to the end of the connecting rod 11 mounted on the wrist pin whereby to provide means for properly lubricating the same.

A housing 31 is provided for enclosing the parts of the mechanism carried on the axle of the car, the end of the housing adjacent the wheel being opened and inserted slightly within an annular drum 32 fixedly carried on the wheel. The communicating end of the housing and the drum are arranged in overlapping relation, with the drum outermost whereby to exclude dirt and dust from entering the same. The drum 33 carried on the rear wheel of the vehicle as shown in Figure 2 of the drawing may comprise a brake drum for an emergency or hand operated brake such as is usually carried on the car.

In the operation of the device when the brakes are to be applied, the air cut-off valve is closed by the operation of the foot brake and it will be apparent that with the inner end of the cylinder entirely sealed that the compression of the air therein caused by the movement of the piston will operate to retard the movement thereof. The piston being connected to the wheels of the car will thus cause the same to stop. Should the foot brake 20 be applied so suddenly and cause too great a pressure to be created in the cylinder by the rapid movement of the piston, the pressure actuated valve arranged in the end of the piston will thereupon be opened so as to relieve the pressure within the cylinder. In this manner the sudden stopping of the car is prevented thereby insuring the stopping of the wheel smoothly and slowly.

It is obvious that the invention is susceptible to various changes and modifications without departing from the spirit thereof or the scope of the appended claim and I accordingly claim all such forms of the device to which I am entitled.

I claim:

A vehicle brake mechanism comprising a cylinder mounted on each axle adjacent each wheel of the vehicle, a piston operatively arranged therein, a bevel gear secured to the adjacent wheel of the vehicle, a connecting rod for the piston, a bevel gear having one end of said rod eccentrically attached thereto, and connected with said first named gear, an air valve in the inner end of the cylinder, means operatively connecting the same with the foot brake of the vehicle, a pair of oppositely arranged pressure regulating valves in the end of the piston, and a sectional housing for each brake mechanism including a cylinder housing section carried by the axle and a drum mounted on the wheel enclosing said gears arranged in overlapping relation with said section.

In testimony whereof I affix my signature.

LLOYD HARRIS.